(12) United States Patent
Zehner et al.

(10) Patent No.: US 6,344,504 B1
(45) Date of Patent: *Feb. 5, 2002

(54) EXTRUSION OF SYNTHETIC WOOD MATERIAL

(75) Inventors: Burch E. Zehner, Gahanna, OH (US); Terry C. Laver, Madison, WI (US)

(73) Assignee: Crane Plastics Company Limited Partnership, Columbus, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,846

(22) Filed: Oct. 31, 1996

(Under 37 CFR 1.47)

(51) Int. Cl.$^7$ .................................................. C08K 5/00
(52) U.S. Cl. ........................................................ 524/14
(58) Field of Search .......................................... 524/14

(56) References Cited

U.S. PATENT DOCUMENTS

| | | | |
|---|---|---|---|
| 2,188,396 A | * 1/1940 | Semon | 18/55 |
| 2,519,442 A | 8/1950 | Delorme et al. | 260/37 |
| 2,935,763 A | 5/1960 | Newman et al. | 18/55 |
| 3,287,480 A | 11/1966 | Wechsler et al. | 264/122 |
| 3,562,373 A | 2/1971 | Logrippo | 264/118 |
| 3,645,939 A | 2/1972 | Gaylord | 260/17.4 GC |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 R |
| 3,879,505 A | 4/1975 | Boutlillier et al. | 264/48 |
| 3,888,810 A | 6/1975 | Shinomura | 260/17.4 BB |
| 3,922,328 A | 11/1975 | Johnson | 264/46.1 |
| 3,943,079 A | 3/1976 | Hamed | 260/17.4 BB |
| 3,954,555 A | 5/1976 | Kole et al. | 162/136 |
| 3,956,541 A | 5/1976 | Pringle | 428/2 |
| 4,012,348 A | 3/1977 | Chelland et al. | 260/28.5 R |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,029,831 A | 6/1977 | Daunheimer | 427/264 |
| 4,045,603 A | 8/1977 | Smith | 428/2 |
| 4,056,591 A | 11/1977 | Goettler et al. | 264/108 |
| 4,071,479 A | 1/1978 | Broyde et al. | 260/2.3 |
| 4,071,494 A | 1/1978 | Gaylord | 260/42.14 |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 CL |
| 4,145,389 A | 3/1979 | Smith | 264/40.7 |
| 4,157,415 A | 6/1979 | Lindenberg | 428/284 |
| 4,168,251 A | 9/1979 | Schinzel et al. | 260/17.4 R |
| 4,178,411 A | 12/1979 | Cole et al. | 428/310 |
| 4,181,764 A | 1/1980 | Totten | 428/155 |
| 4,187,352 A | 2/1980 | Klobbie | 521/79 |
| 4,191,798 A | 3/1980 | Schumacher et al. | 428/95 |
| 4,203,876 A | 5/1980 | Dereppe et al. | 260/17.4 R |
| 4,228,116 A | 10/1980 | Colombo et al. | 264/119 |
| 4,239,679 A | 12/1980 | Rolls et al. | 260/42.49 |
| 4,241,133 A | 12/1980 | Lund et al. | 428/326 |

(List continued on next page.)

FOREIGN PATENT DOCUMENTS

| | | | |
|---|---|---|---|
| DE | 2042176 | * | 4/1971 |
| DE | 3801574 | * | 8/1989 |
| EP | 0586211 | * | 3/1994 |

(List continued on next page.)

OTHER PUBLICATIONS

Bendtsten et al., Mechnical Properties of Wood, pp. 4–2 to 4–4.*

Bibliography of Sold Phase Extrusion, pp. 187–195.*

Brzoskoski et al., Air–Lubricated Die for Extrusion of Rubber Compounds, Rubber Chemistry and Technology, vol. 60, pp. 945–956.*

Collier et al., High Strength Extrudates by Melt Transformation Coextrusion, ANTEC, 1987, pp. 497–502.*

Collier et al., Streamlined Dies and Profile Extrusion, ANTEC, 1987, pp. 203–206.*

Company News, Plastics Industry News, May 1994, pp. 70–71.*

Dalväg et al., The Efficiency of Cellulosic Fillers in Common Thermoplastics. Part II. Filling with Processing Aids and Coupling Agents, Inter. J. Polymeric Mater. 1985, vol. 11, pp. 9–38.*

Fiberloc Polymer Composites, B. F. Goodrich, Geon Vinyl Division, section 1, pp. 2–15.*

Fill Thermoplastics with Wood, Modern Plastics, May 1974, pp. 54–55.*

Fillers for Thermoplastics: Beyond Resin Stretching, Modern Plastics International, Oct. 1976, pp. 12–15.*

From Sweden: Extruded Interior Trim Made of PVC and Wood Flour, Plastic Building Construction, vol. 9, No. 1986, pp. 5–6.

Henrici–Olive et al., Integral/Structural Ploymer Foams, Technology, Properties and Applications, Springer–Verlag, pp. 111–122.

(List continued on next page.)

*Primary Examiner*—Bernard Lipman
(74) *Attorney, Agent, or Firm*—Standley & Gilchrest LLP

(57) ABSTRACT

An extruded wood simulative material is described which includes a high degree of cellulosic material content and begins with powdered thermoplastic material.

9 Claims, 1 Drawing Sheet

U.S. PATENT DOCUMENTS

| | | |
|---|---|---|
| 4,244,903 A | 1/1981 | Schnause ..................... 264/68 |
| 4,248,743 A | 2/1981 | Goettler ............... 260/17.4 BB |
| 4,250,222 A | 2/1981 | Mavel et al. ................ 428/285 |
| 4,263,184 A | 4/1981 | Leo et al. ............ 260/17.4 CL |
| 4,263,196 A | 4/1981 | Schumacher et al. ....... 260/33.6 |
| 4,272,577 A | 6/1981 | Lyng .......................... 428/112 |
| 4,273,688 A | 6/1981 | Porzel et al. ........... 260/17.4 R |
| 4,303,019 A | 12/1981 | Haataja et al. .............. 108/51.1 |
| 4,305,901 A | 12/1981 | Prince et al. ........... 264/176 R |
| 4,317,765 A | 3/1982 | Gaylord ..................... 523/204 |
| 4,323,625 A | 4/1982 | Coran et al. ................ 428/361 |
| 4,376,144 A | 3/1983 | Goettler ....................... 428/36 |
| 4,382,758 A | 5/1983 | Nopper et al. ............. 425/82.1 |
| 4,414,267 A | 11/1983 | Coran et al. ................ 428/288 |
| 4,420,351 A | 12/1983 | Lussi et al. ................ 156/62.4 |
| 4,430,468 A | 2/1984 | Schumacher ............... 524/109 |
| 4,480,061 A | 10/1984 | Coughlin et al. ............. 524/13 |
| 4,491,553 A | 1/1985 | Yamada et al. ............... 264/51 |
| 4,503,115 A | 3/1985 | Hemels et al. ............... 428/281 |
| 4,505,869 A | 3/1985 | Nishibori .................... 264/115 |
| 4,506,037 A | 3/1985 | Suzuki et al. ................. 521/82 |
| 4,508,595 A | 4/1985 | Gåsland ...................... 162/158 |
| 4,562,218 A | 12/1985 | Fornadel et al. .............. 524/15 |
| 4,594,372 A | 6/1986 | Natov et al. ................ 523/208 |
| 4,597,928 A | 7/1986 | Terentiev et al. ............. 264/87 |
| 4,610,900 A | 9/1986 | Nishibori ..................... 428/15 |
| 4,645,631 A | 2/1987 | Hegenstaller et al. ......... 264/69 |
| 4,659,754 A | 4/1987 | Edwards et al. ............ 523/214 |
| 4,687,793 A | 8/1987 | Motegi et al. ............... 523/200 |
| 4,717,742 A | 1/1988 | Beshay ....................... 523/203 |
| 4,737,532 A | 4/1988 | Fujita et al. .................. 524/13 |
| 4,783,493 A | 11/1988 | Motegi et al. ................ 524/13 |
| 4,789,604 A | 12/1988 | van der Hoeven .......... 428/503 |
| 4,791,020 A | 12/1988 | Kokta ......................... 428/326 |
| 4,801,495 A | 1/1989 | van der Hoeven .......... 428/286 |
| 4,818,604 A | 4/1989 | Tock ........................ 428/319.9 |
| 4,820,749 A | 4/1989 | Beshay ....................... 523/203 |
| 4,851,458 A | 7/1989 | Hopperdietzel ............. 523/205 |
| 4,889,673 A | 12/1989 | Takimoto .................... 264/118 |
| 4,894,192 A | 1/1990 | Warych ....................... 264/68 |
| 4,915,764 A | 4/1990 | Miani .................... 156/244.19 |
| 4,927,572 A | 5/1990 | van der Hoeven ............ 264/22 |
| 4,927,579 A | 5/1990 | Moore ........................ 264/101 |
| 4,935,182 A | 6/1990 | Ehner et al. ................ 264/112 |
| 4,968,463 A | 11/1990 | Levasseur .................. 264/40.1 |
| 5,008,310 A | 4/1991 | Beshay ......................... 524/13 |
| 5,009,586 A | 4/1991 | Pallmann .................... 425/311 |
| 5,064,592 A | 11/1991 | Ueda et al. |
| 5,075,359 A | 12/1991 | Castagna et al. .............. 524/13 |
| 5,078,937 A | 1/1992 | Eela ............................ 264/109 |
| 5,082,605 A | 1/1992 | Brooks et al. ............. 264/40.6 |
| 5,087,400 A | 2/1992 | Theuveny ................... 264/115 |
| 5,088,910 A | 2/1992 | Goforth et al. ............. 425/142 |
| 5,096,046 A | 3/1992 | Goforth et al. ............. 198/604 |
| 5,096,406 A | 3/1992 | Brooks ....................... 425/205 |
| 5,120,776 A | 6/1992 | Raj et al. ...................... 524/13 |
| 5,153,241 A | 10/1992 | Beshay ......................... 524/8 |
| 5,194,461 A | 3/1993 | Bergquist et al. ............. 524/13 |
| 5,272,000 A | 12/1993 | Chenoweth et al. ........ 428/283 |
| 5,276,082 A | 1/1994 | Forry et al. ................. 524/504 |
| 5,288,772 A | 2/1994 | Hon ............................ 524/35 |
| 5,302,634 A | 4/1994 | Mushovic ................... 523/219 |
| 5,369,147 A | 11/1994 | Mushovic ................... 523/219 |
| 5,406,768 A | 4/1995 | Giuseppe et al. ........... 52/730.4 |
| 5,474,722 A | 12/1995 | Woodhams ................ 264/45.3 |
| 5,480,602 A | 1/1996 | Nagaich ..................... 264/122 |
| 5,486,553 A | 1/1996 | Deaner et al. ................ 524/13 |
| 5,497,594 A | 3/1996 | Giuseppe et al. ........... 52/730.4 |
| 5,516,472 A * | 5/1996 | Laver ......................... 264/118 |
| 5,518,677 A | 5/1996 | Deaner et al. .............. 264/142 |
| 5,532,065 A | 7/1996 | Gübitz ........................ 428/480 |
| 5,539,027 A | 7/1996 | Deaner et al. ................ 524/13 |
| 5,576,374 A | 11/1996 | Betso et al. ................. 524/451 |
| 5,585,155 A | 12/1996 | Heikkila et al. ........... 428/36.7 |
| 5,593,625 A | 1/1997 | Riebel et al. ............... 264/115 |

FOREIGN PATENT DOCUMENTS

| | | | |
|---|---|---|---|
| EP | 0586212 | * | 3/1994 |
| EP | 0586213 | * | 3/1994 |
| EP | 0747419 | * | 12/1996 |
| FR | 2270311 | * | 2/1974 |
| FR | 2365017 | * | 4/1978 |
| FR | 2445885 | * | 8/1980 |
| FR | 2564374 | * | 11/1985 |
| GB | 2104903 | * | 3/1983 |
| GB | 2171953 | * | 9/1986 |
| GB | 2186655 | * | 8/1987 |
| GB | 1443194 | * | 7/1996 |
| WO | WO 90/08020 | * | 7/1990 |

OTHER PUBLICATIONS

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III: Effect of Silane as Coupling Agent, Journal of Vinyl Technology, Sep. 1990, pp. 146–153.

Kokta et al., Use of Grafted Wood Fibers in Thermoplastic Composites v. Polystyrene, Centre de recherche en pâtes et papiers, Université du Québec à Trois–Rivières, Canada.

Kokta et al., Use of Wood Fibers in Thermoplastic Composites, Polymer Composites, Oct. 1993, pp. 229–232.

Maldas et al., Composites of Polyvinyl Chloride–Wood Fibers: IV. Effect of the Nature of Fibers, Journal of Vinyl Technology, Jun. 1989, pp. 90–98.

Maldas, et al., Improving Adhesion of Wood Fiber with Polystrene by the Chemical Treatment of Fiber with a Coupling Agent and the Influence on the Mechanical Properties of Composites, Journal of Adhesion Science Technology, vol. 3, No. 7, pp. 529–539 (1989).

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, '92, pp. 602–604.

Myers et al., Wood Fiber/Polymer Composites: Fundamental Concepts, Processes, and Material Options, Wood flour and polypropylene or high–density polyethylene composites: influence of maleated polypropylene concentration and extrusion temperature on properties, pp. 49–56.

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastis: Studies on Mechanical Properties, Science and Engineering of Composite Materials, vol. 1, No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Sonwood: a new PVC wood–flour alloy for Extrusions and other Plastic Processing Techniques, Sonesson Plast AB, Malmo, Sweden.

Techno Material, Techno Material Co., Ltd.

Thomas et al., Wood Fibers as Reinforcing Fillers for Polyolefins, ANTEC, 1984, pp. 687–689.

Woodhams et al., Wood Fibers as Reinforcing Fillers for Polyolefins, Polymer Engineering and Science, Oct. 1984, pp. 1166–1171, vol. 24, No. 15.

Yam et al., Composites from Compounding Wood Fibers With Recycled High Density Polyethylene, Polymer Engineering and Science, mid–Jun. 1990, pp. 693–699. vol. 30, No. 11.

Yuskova, et al., Interaction of Components in Poly(Vinyl Choloride) Filled in Polymetization Makroniol Chem., Macromol. Symp. 29, 315–320. (1989).

Zadorecki et al., Future Prospects for Wood Cellulose as Reinforcement In Organic Polymer Composites, Polymer Composites, Apr. 1989, pp. 69–77.

* cited by examiner

EXTRUSION OF SYNTHETIC WOOD MATERIAL

BACKGROUND AND SUMMARY OF THE INVENTION

The present invention relates generally to wood replacement materials. In particular, the present invention relates to a wood-polymer composite material suitable for use in place of natural wood. The present invention includes a process for manufacturing the composite materials.

For several reasons, there is a need to find other materials that exhibit the look and feel of natural wood. One reason has to do with the supply of good wood for construction purposes from the world's forests. The supply of wood from mature trees has become an important issue in recent years and as a result the cost of wood has risen.

Several attempts have been made by others to find a wood like material. Many of these efforts have failed due to the poor qualities of the resultant product.

In addition to natural wood, other materials such as particle board, wafer board, and the like may be replaced by the synthetic wood of the present invention. One noticeable improvement over these materials is that synthetic wood has enhanced moisture resistance.

The present invention overcomes many of the disadvantages of the prior art attempts at a quality wood replacement material that is capable of being produced in a commercially practicable production environment. The present invention includes the combining of cellulosic material with a thermoplastic material and optionally with a cross-linking agent to form a combined product.

In the present invention an extrusion of the combined product under sufficient conditions to blend the combined product into a homogeneous mixture is described. The mixture of material is extruded through at least one die in a manner described in greater detail hereinafter.

The extruder preferably comprises a hopper to receive and mix the organic fibrous material and the thermoplastic material before being extruded through the die system. In a preferred material composition of the present invention, the synthetic wood material includes approximately two-thirds organic fibrous or cellulosic material and approximately one-third thermoplastic material in combination. The resultant product has an appearance similar to wood and may be sawed, sanded, shaped, turned, fastened and/or finished in the same manner as natural wood. The resultant product is resistant to rot and decay as well as termite attack. The resultant product may be used for example as, decorative moldings inside or outside of a house, picture frames, furniture, porch decks, window moldings, window components, door components, roofing systems, and any other type of use where structural requirements do not exceed the physical properties of the resultant material.

The present invention is useful in a number of different extrusion environments in which at least one extrusion die is employed. More particularly, in a preferred embodiment of the present invention, it is useful in conjunction with the synthetic wood composition and method as described in U.S. Pat. No. 5,516,472 which issued on May 14, 1996, entitled EXTRUDED SYNTHETIC WOOD COMPOSITION AND METHOD FOR MAKING SAME.

DETAILED DESCRIPTION OF PREFERRED EMBODIMENT(S)

Figure 1:
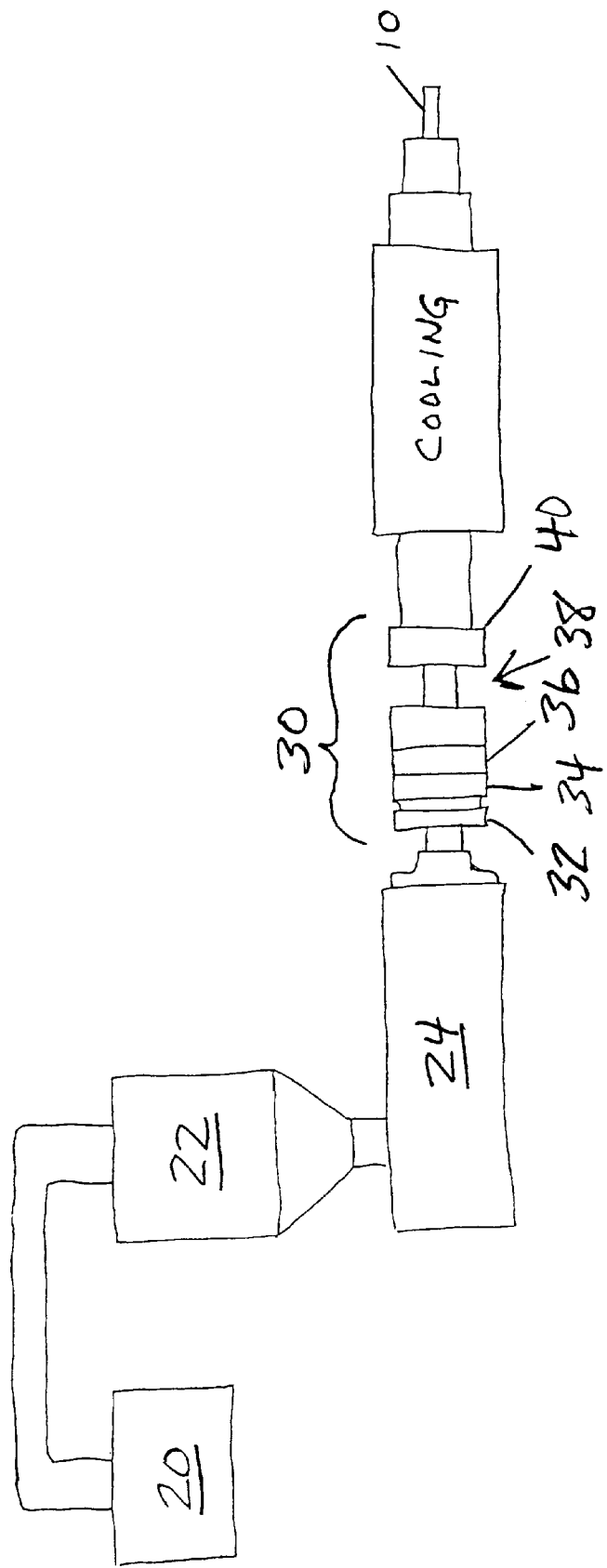
FIG. 1 is a schematic diagram illustrating the process of the present invention.

The present invention is directed toward synthetic wood extrusions of the type in which synthetic wood material composites are extruded through at least one die. The die may produce strands of the composite material that flow into a packer or in another embodiment of the invention, the die may simply produce one flowable homogeneous mass of material into the packer.

A compression ratio of about 1.5 to 1 up to 3.5 to 1 or higher is preferred. For example, when a plate of a die through which material is extruded has an equal cross-sectional area as the cross-sectional area of the packer, the compression ratio is said to be 1 to 1. When the cross-sectional area of extrusion of the plate of a die is twice the size of the cross-sectional of the packer opening, the compression ratio is said to be 2 to 1.

As the strands or mass of material, in the preferred embodiment, leave the stranding die and enter the packer the material 10 is compressed causing the material to bond to adjacent material strands. In a packer, the final shape is maintained while the cross linking agents continue to react which bond the material together along with the individual cellulose molecular chains. The formed product is then cooled in a cooling tank 16 and transported to an area where it may be cut into desired lengths.

The cellulosic fibrous-polymer composite material used in the present invention may have a higher cellulosic fiber content then normally recognized. The overall process may include the mixing of raw materials including cellulosic fibers, thermoplastic materials of a powder consistency, cross-linking agents and process lubricants. The cellulosic material may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo or palm fiber, and kenaf. Cellulosic material is first dried to a low moisture content. Although apparently not critical a preferred moisture content is about 1% to 10%.

Thermoplastic materials may include multilayer films, polyethylene, polypropylene, low density polyethylene (LDPE), ethyl-vinyl acetate, other polyethylene copolymers and other thermoplastics of a powder consistency.

Examples of cross-linking agents include polyurethanes, such as isocynate, phenolic resins, unsaturated polyesters and epoxy resins and combinations of the same. Lubricants may be added as a process aid. Examples of lubricants include zinc stearate or wax. Other materials may be added which are known to the art of extrusion and include accelerators, inhibitors, enhancers, compatibilizers and blowing agents.

An example formulation recipe is described below:

| Recipe | Amount (parts per total) |
| --- | --- |
| Wood Flour (40/mesh maple) | 250 |
| Polyethylene | 100 |
| Zinc Stearate | 7.5 |
| External Wax | 5 |
| Phenolic Resin | 15 |
| Isocyanate (MDI) | 2.5 |

In the preferred embodiment of the present invention the cellulosic fiber and powdered thermoplastic raw materials are physically mixed with the cross-linking agents and lubricants in a blender 20, and subsequently placed into a feed hopper 22. A preferred commercially available polyethylene is Petrothene LB 010000 Roto-Molding Powder (density 0.952 g/cc, melt index 0.3, Quantum Chemicals, Iselin, N.J.). A preferred phenolic resins is Varcom 29328

Two-Step Phenloic resin, 9% hexane, 90 degrees C. softening point (Occidental Chemical Corporation, Dallas, Tex.). A preferred MDI is PAPI 2027 Polymeric MDI, 2.7 functionality, (Dow Chemical, Midland, Mich.). A preferred zinc stearate is GP available from Synthetic Products Company, Cleveland, Ohio. A preferred external wax is paraffin, such as EBS paraffin from GE Plastics, Pittsfield, Mass.

The mixing of the materials may be accomplished by any simple mixing device. A powdered thermoplastic material is preferred over pellet form, to provide a better blended mixture with the cellulosic content. With a better blended mixture to begin the process the resulting extruded product is more attractive, and has better resultant structural characteristics due to improved bonding of the materials in the mixture.

A typical feed hopper may be used such as a gravity feed hopper or a hopper with a force feed mechanism known as a crammer. Once the materials are properly mixed and transferred to the hopper, they are delivered utilizing a crammer feeder to a heated extruder 24. The extruder utilizes low temperature mixing and extruding. The preferred mixing temperature at the extruder is around 330° F. Several well known extruders may be used in the present invention. A twin screw extruder by Cincinnati Milacron (CM-80-Hp) may be used. In the extruder, the materials are blended and heated and then forced into a die system. The flow rate of the extruder may be between about 150 and 600 pounds per hour or higher depending upon the extruder used. The die system 30 is made up of one or more plates. The die system allows the starting materials to bond and form a shaped-homogeneous product. A typical plate may be made from cast iron and stainless steel material.

In one embodiment the die system is comprised of a plurality of plates nested together to form one continuous die. The first die connected to the extruder is known as an adapter die 32. Following the adapter die is a transition die 34. The transition die transforms the combined material discharged from the round stock exiting the adapter die to a shape more generally approaching that of the finished product. Following the transition die may be a stranding die 36. The stranding die plate has multiple apertures which may be substantially round. In a preferred embodiment the stranding die contains apertures which are approximately one-eighth of an inch or larger in diameter. As the material leaves the stranding die it leaves in strands of homogeneous material which are compressed together in a compression die section 38. The compression die section is contemplated to take a shape of many common items such as decorative house hold moldings including crown moldings, chair rails, baseboards, door moldings, picture frames, furniture trim, and other products. After passing through the compression die section the material enters the setting die 40 where the final shape is maintained. This setting die is also known as the packer. The final shape is maintained yet substantially compressed in overall cross section area. A compression ratio at the packer of about 1.5 to 1 to about 3.5 to 1 provides substantial improvements in the quality of the finished product. With the higher compression ratio of the present invention the resultant product is less likely to crack, split, or otherwise fail in actual applications. The higher compression of the present invention results in a greater degree of material compaction and molecular adhesion.

The above described advantages and features of the present invention are offered as an example of the way in which the present invention may be commercially implemented. The embodiments listed herein are, therefore, exemplary in nature and are not intended to unnecessarily limit the scope of the following claims.

What is claimed is:

1. A wood-simulative composition for making an extruded product, said composition comprising:
   at least 50% by weight cellulosic material;
   at least 16% by weight thermoplastic material having a powder consistency, said powder consistency enabling said thermoplastic material to be mixed with said cellulosic material in a blender without having been shredded;
   at least 1% by weight lubricant material;
   at least 1% by weight phenolic resin material; and
   at least 1% by weight of a compound containing one or more isocyanate groups.

2. The composition of claim 1, wherein said lubricant includes zinc stearate and a wax.

3. The composition of claim 1, wherein said compound is MDI.

4. A method for extruding synthetic wood material, said method comprising:
   providing cellulosic material, thermoplastic material having a powder consistency, lubricant material, phenolic resin material, and a compound containing one or more isocyanate groups;
   mixing together said cellulosic material, said thermoplastic material, said lubricant material, said phenolic resin material, and said compound containing one or more isocyanate groups to form a mixture comprised of at least about 50% by weight of said cellulosic material, at least about 16% by weight of said thermoplastic material, at least about 1% by weight of said lubricant material, at least about 1% by weight of said phenolic resin material, and at least about 1% by weight of said compound containing one or more isocyanate groups; and
   extruding said mixture through a die system;
   wherein said method excludes a step of shredding said thermoplastic material.

5. The method of claim 4 wherein said lubricant material includes zinc stearate and a wax.

6. The method of claim 4 wherein said compound is MDI.

7. A method for extruding synthetic wood material, said method consisting essentially of:
   providing cellulosic material, thermoplastic material having a powder consistency, lubricant material, phenolic resin material, and a compound containing one or more isocyanate groups;
   mixing together said cellulosic material, said thermoplastic material, said lubricant material, said phenolic resin material, and said compound containing one or more isocyanate groups to form a mixture comprised of at least about 50% by weight of said cellulosic material, at least about 16% by weight of said thermoplastic material, at least about 1% by weight of said lubricant material, at least about 1% by weight of said phenolic resin material, and at least about 1% by weight of said compound containing one or more isocyanate groups; and
   extruding said mixture through a die system.

8. The method of claim 7 wherein said lubricant material includes zinc stearate and a wax.

9. The method of claim 7 wherein said compound is MDI.

* * * * *